Dec. 13, 1932.  W. HOWARD  1,890,853
VEHICLE SUSPENSION SPRING
Filed April 27, 1931   2 Sheets-Sheet 1
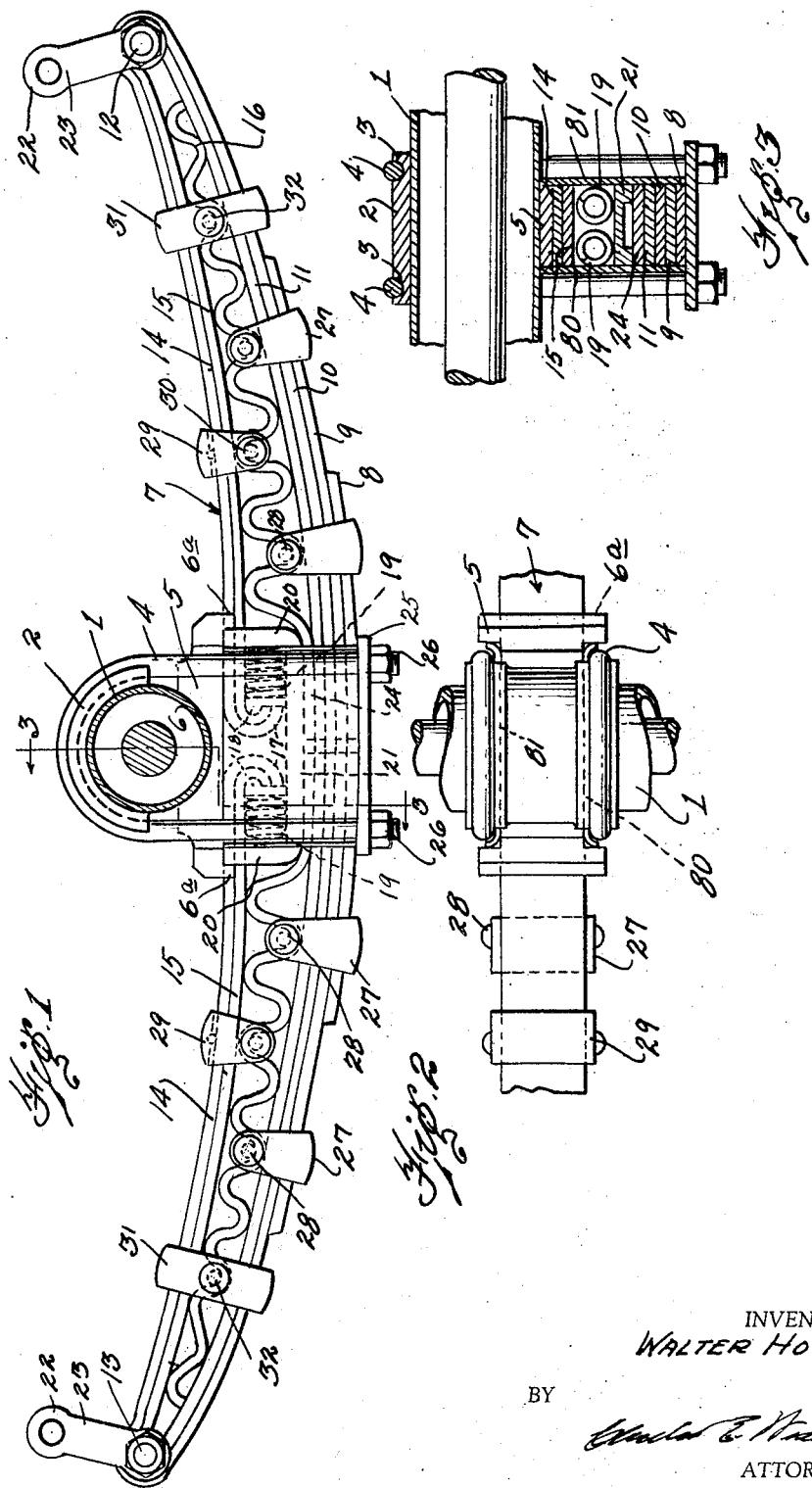
INVENTOR.
WALTER HOWARD
BY
ATTORNEY.

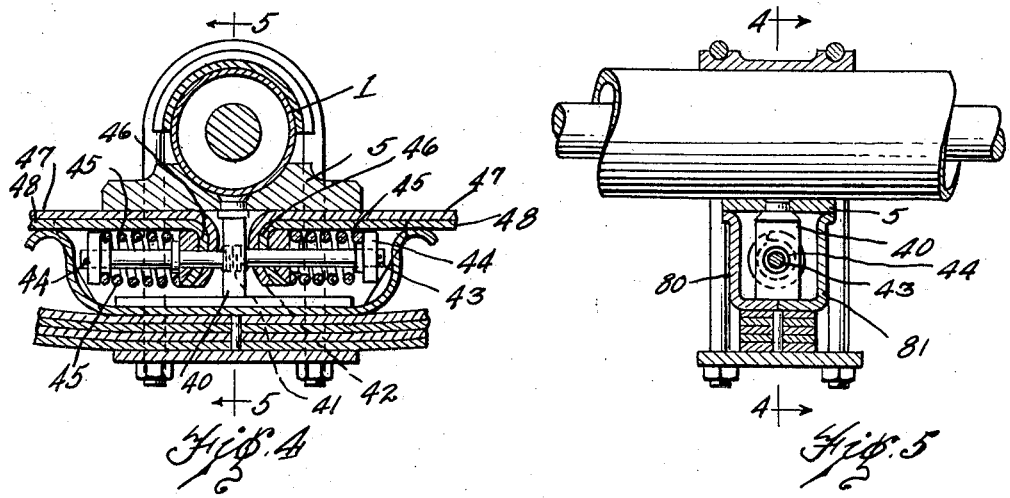
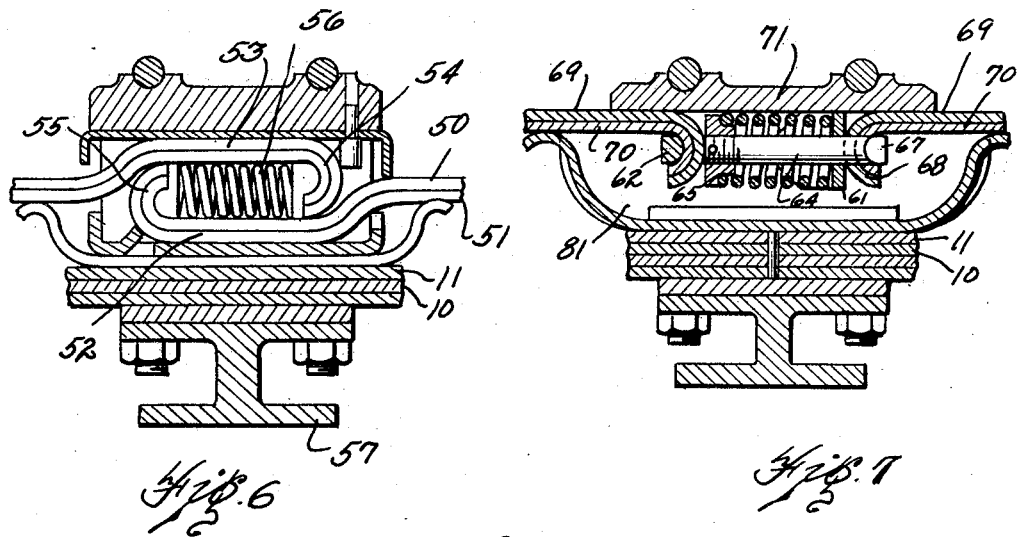
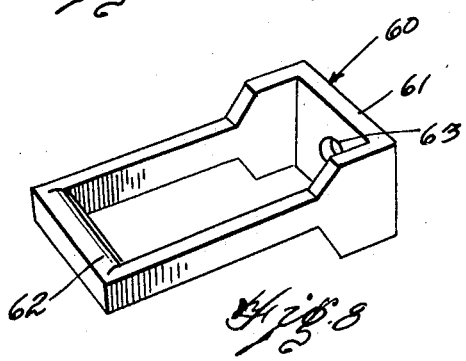
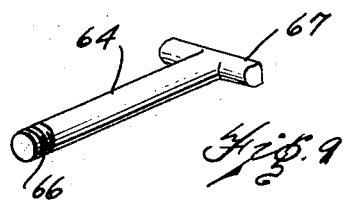

Patented Dec. 13, 1932

1,890,853

UNITED STATES PATENT OFFICE

WALTER HOWARD, OF DETROIT, MICHIGAN

VEHICLE SUSPENSION SPRING

Application filed April 27, 1931. Serial No. 533,133.

This invention relates to vehicle suspension springs and an object of the invention is to provide a device of this character which is light in weight and flexible in operation.

It has been the custom heretofore to make springs of this character consisting of a plurality of leaf springs and, due to the thickness of the combined leaves, very little flexing takes place except on the extreme ends of the spring. With my improved structure I attain the same stiffness of spring while still permitting the same to be easily flexed by interposing a flexible spreader between the upper and lower spring leaves.

Another object of the invention is to provide a leaf spring in which the two upper leaves are return-bent around the respective shackle bolts and the ends of the leaves each formed with an extension for abutting one end of a spiral spring, the spiral spring tending to force the inturned ends of the leaf springs toward each other thereby resisting downward pressure applied to the ends of the leaves.

These objects and the several novel features of the invention are hereinafter more fully described and claimed, and the preferred form of construction of the invention is shown in the accompanying drawings in which—

Fig. 1 is a side elevational view of my improved spring structure.

Fig. 2 is a top plan view of the center portion thereof.

Fig. 3 is a section taken substantially on line 3—3 of Fig. 1.

Fig. 4 is a sectional view taken on line 4—4 of Fig. 5 and showing a modified form of structure.

Fig. 5 is a section taken on line 5—5 of Fig. 4.

Figs. 6 and 7 are sectional views showing modified forms of structure.

Figs. 8 and 9 are details of the helical spring clamping means shown in Fig. 7.

Referring now to the drawings, it will be seen that the axle housing 1 is provided on its upper circumference with the cap 2 the same being provided with the grooves 3 for receiving the U bolts 4. A casting 5 is provided with the groove 6 for receiving the lower half of the axle housing 1 and is provided with the downturned tongues 6a for engaging over the edges of the leaf spring 7. The leaf spring 7 comprises the leaves 8, 9, 10 and 11, and it will be seen that the leaves 10 and 11 are return-bent around the respective shackle bolts 12 and 13 and the return-bent portions 14 and 15 are spaced from the leaf 11 and are held in spaced relation thereto by means of the plicate spring or flexible spreader 16 and the extreme inner end of the return-bent portions 14 and 15 are rounded at 17 to receive the inserts 18 against which the springs 19 abut.

The outer ends of the springs 19 abut the ends 20 of the U shaped member 21 and it will be seen that the tongues 6a on the member 5 engage over the upper edges of the upturned ends 20 and prevent longitudinal displacement of the member 21. It will be noted that the tendency of the helical springs 19 is to move the rounded ends 17 toward each other thereby tending to resist the downward pressure which may be applied to the shackle bolts 12 and 13, and it will be understood that the upper ends 22 of the shackles 23 will be secured to a vehicle body in the usual manner. It will be seen that the portion 24 of the plicate spring 16 extends under the horizontal portion of the U shaped member 21 and the plate 25 abuts the lower leaf 8 and clamps the leaves 8, 9, 10, 11 and the portion 24 of the flexible spreader 16 together by means of the nuts 26 engaging over the lower ends of the U-shaped bolts 4. A plurality of U-shaped members 27 engage under the leaves 8 and 9 and the bolts or rivets 28 extend through some of the loop portions of the spring 16 while the U-shaped members 29 engage over the return-bent portion 14 and the bolts or rivets 30 extend through the lower end thereof and also through one of the loops formed in the spring 16. The clamps 31 are positioned adjacent the ends of the flexible spreader 16 and clamp the leaves 10 and 11 to the return-bent portions 14 and 15 thereof and the bolts or rivets 32 pass through the center of the clamping members 31 and also through one of the loops formed in the spring 16.

It will be seen by this construction that the weight applied to the shackles 23 will cause a flexing of the spring 7 practically throughout its length but, due to the construction of the spreader 16, it will resist the pressure as much as would a spring composed entirely of single leaves.

Referring to Figs. 4 and 5, it will be seen that the portion directly below the axle housing 1 is slightly different from that shown in Fig. 1 while the remainder of the construction is the same as heretofore described. It will be seen that the member 5 in this modification is provided centrally thereof with the depending plate 40, the same in turn being provided with the threaded aperture 41 for receiving the enlarged threaded portion 42 of the rod 43 the same having secured to its outer ends the spring abutments 44. It will be noted that the tendency of the springs 45 is to move the ends 46 of the leaves 47 and 48 toward each other in a manner similar to that described in Fig. 1. Referring to Fig. 6, it will be seen that the return-bent portions 50 and 51 of the leaves 10 and 11 are offset at 52 and 53 and the rounded ends 54 and 55 of the return-bent portions 50 and 51 have suitable inserts therein which engage the ends of the spring 56 and the tendency of the spring 56 is to move the ends 54 and 55 in a direction to exert an inward pull on the return-bent portions 50 and 51 of the leaves 10 and 11. It will be further seen that the axle 57 in this modification is positioned below the leaves of the spring.

It is to be understood that any of the forms of spring herein shown may be used as an underslung or overslung spring. Referring to Figs. 7, 8 and 9, it will be seen that the yoke 60 is provided with the spring abutting portion 61 and at its opposite end with the rounded end portion 62 and that the end 61 is provided with an aperture 63 for receiving the shank of the T bolt 64. A spring abutting collar 65 is threaded and pinned to the threaded end 66 of the T bolt 64 while the rounded head 67 of the T bolt engages the inturned end 68 of the return-bent portion 69 and 70 of the springs 10 and 11. The opposite rounded end 68 of the return-bent portion 69 and 70 of the opposite end of the springs 10 and 11 is engaged by the rounded portion 62 of the yoke 60 and the tendency of the spring 71 is to move the rounded end portions 68 toward each other as has been the case with the other modified forms of the spring structure. If it is desired, side plates 80 and 81 may be provided to keep dirt and grit from depositing on any of the helical springs positioned below the axle.

From the foregoing description it becomes evident that I have provided a vehicle suspension spring which is extremely light in weight while still offering the maximum resistance to pressure exerted to flex the same and which is so constructed as to permit flexing of the spring practically throughout its entire length when pressure is applied to the outer ends thereof.

Having thus briefly described my invention, its utility and mode of operation, what I claim and desire to secure by Letters Patent of the United States is—

1. A vehicle suspension spring comprising a plurality of spring leaves, some of the upper leaves of the spring being return-bent and lying in spaced relation to the main portion of the leaves, a flexible spreader positioned between the return-bent portion and the main portion of the leaves, and spring means so positioned in relation to the return-bent portion of the leaves as to resist downward pressure applied to the ends thereof.

2. A vehicle suspension spring comprising a plurality of spring leaves, a pair of shackle bolts, two of the leaves return-bent around the respective shackle bolts and lying in spaced relation to the main portion of the spring leaves, a flexible spreader positioned within the space formed between the return-bent portions and the main portion of the leaves, and spring means so positioned in relation to the return-bent portion of the two leaves as to resist downward pressure applied thereto.

3. A vehicle suspension spring comprising a plurality of spring leaves, a pair of shackle bolts, some of the leaves return-bent around the respective shackle bolts and lying in spaced relation to the main portion of the spring leaves, a plicate spring positioned in the space formed between the return-bent portion and the main portion of the leaves, and spring means so positioned in relation to the return-bent portion of the leaves as to resist downward pressure applied to the ends thereof.

4. A vehicle suspension spring comprising a plurality of spring leaves, some of the leaves return-bent and lying in spaced relation to the main portion of the leaves, a plicate spring positioned in the space formed between the return-bent portions and the main portion of the leaves, the inner ends of the return-bent portions of the leaves downturned, and a helical spring abutting the down-turned ends of the return-bent portions of the leaves to resist downward pressure applied to the ends thereof.

5. A vehicle suspension spring comprising a plurality of spring leaves, at least one of the upper leaves lying in spaced relation to the balance of the leaves, a flexible spreader positioned in the space provided between the upper leaf and the balance of the leaves and spring means so positioned in relation to the upper leaf as to resist downward pressure applied to the ends thereof.

6. A vehicle suspension spring, comprising means adjacent the center thereof for securing the spring to a vehicle axle, a plurality of spring leaves extending from each side of the center securing means, a pair of shackle bolts one positioned adjacent each outer end of the spring leaves, at least one of the leaves return bent around each shackle bolt and lying in spaced relation to the rest of the leaves and the adjacent ends thereof each formed with an offset portion, a flexible spreader positioned in the space formed between the return bent portion and the main portion of the leaves, and spring means engaging the offset portion of the leaves to resist downward pressure applied to the shackle bolts.

In testimony whereof I sign this specification.

WALTER HOWARD.